I. A. Dunham's sole or welt trimmer.

4454 Reissued Jul 4 1871

Witnesses.

F. C. Hale

F. P. Hale

Inventor.

Isaac A. Dunham

UNITED STATES PATENT OFFICE.

ISAAC A. DUNHAM, OF NORTH BRIDGEWATER, MASSACHUSETTS.

IMPROVEMENT IN EDGE-PLANES FOR SHOEMAKERS.

Specification forming part of Letters Patent No. 18,237, dated September 22, 1857; reissue No. 4,454, dated July 4, 1871.

*To all whom it may concern:*

Be it known that I, ISAAC A. DUNHAM, of North Bridgewater, in the county of Plymouth and State of Massachusetts, have invented a new and useful Boot and Shoe-Makers' Tool, which I denominate a "Sole or Welt-Trimmer;" and that the following description, taken in connection with the accompanying drawing hereinafter referred to, forms a full and exact specification of the same, wherein I have set forth the nature and principles of my said invention, by which it may be distinguished from others of a similar class, together with such parts as I claim and desire to have secured to me by Letters Patent.

Figure 1:
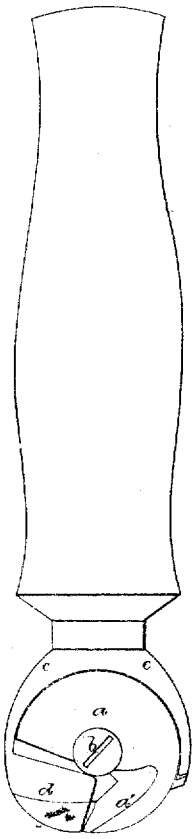
Figure 2:
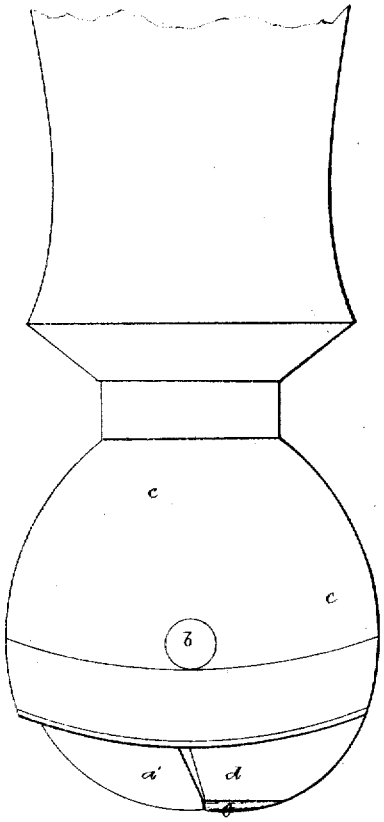
Figure 3:
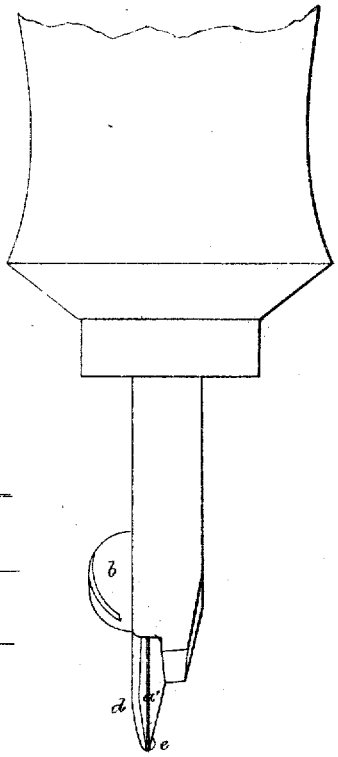

The figures of the accompanying drawing represent my sole or welt-trimmer. Figure 1 is a front or face view of the same. Fig. 2 is an edge view on an enlarged scale; and Fig. 3 is a view of the rear side of the tool, also on an enlarged scale.

The operation of trimming or cutting off the inner edge of the sole of a boot or shoe, or that portion nearest the vamp or upper, has heretofore usually been done by the workman with an ordinary knife. To do this neatly and with rapidity has required great skill and care on the part of the operator, else the vamp or upper would be cut; and many boots and shoes have been spoiled in this manner.

By the use of my improved sole or welt-trimmer the necessary operation can be performed with the utmost rapidity and nicety, and without any probability of injuring the vamp or upper, a cutting-blade and guard being used, which together form a circle or very nearly, the cutting-blade being so arranged as to be readily set up to its guard as fast as it becomes worn.

*a a'* in the drawing represent a circular plate, of which the cutting-blade *a'* forms a part. This cutter turns upon a screw-pivot, *b*, by which it is secured in any desired position to the stationary stock *c c*. *d d* is a guard attached to or forming a part of the stock *c c*. On this guard and close to the point of the cutting-blade *a'* is a small projection or nipple, *e*, Figs. 2 and 3, which, as the tool is moved forward, brings the leather to be removed directly across the edge of the cutter, and thereby cuts it free of the sole or welt. Were the guard unprovided with the nipple the shaving of leather would be cut the requisite depth without being entirely separated from the sole or welt, and would have to be picked out. The cutting-blade *a'* is brought close to the guard, which slightly overlaps it, as shown, so that it is utterly impossible for the cutter to come in contact with the vamp or upper, even if the tool be unskillfully used by the operator.

It will be seen that by hanging the cutter upon a screw-pivot, *b*, the blade *a'*, as fast as it becomes worn, may be set up to the guard *d d*. By means of the tool thus constructed the sole or welt can be trimmed much faster and more evenly than by an ordinary knife, while there is no danger of injuring the upper leather.

Having thus described my improvements, what I claim as my invention, and desire to have secured to me by Letters Patent, is—

1. The above-described sole or welt-trimmer as composed of a cutting-blade, *a'*, a guard, *d d*, and stock *c c*, constructed, arranged, and combined together, substantially as set forth.

2. In combination with the cutter *a'* and guard *d d*, the nipple or projection *e*, as and for the purpose set forth.

ISAAC A. DUNHAM.

Witnesses:

SAMUEL JONES,

F. C. HALE.